United States Patent
Gotoh et al.

(10) Patent No.: US 10,462,883 B2
(45) Date of Patent: Oct. 29, 2019

(54) LIGHT CONTROL COMMUNICATION SYSTEM, LIGHT CONTROL COMMUNICATION METHOD AND PROGRAM

(71) Applicant: Panasonic Intellectual Property Management Co., Ltd., Osaka (JP)

(72) Inventors: Shigeo Gotoh, Osaka (JP); Tomomi Hashimoto, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/220,134

(22) Filed: Dec. 14, 2018

(65) Prior Publication Data

US 2019/0191530 A1  Jun. 20, 2019

(30) Foreign Application Priority Data

Dec. 20, 2017  (JP) ................................ 2017-243398

(51) Int. Cl.
 *H05B 33/08* (2006.01)
 *H05B 37/02* (2006.01)
 *H04L 29/06* (2006.01)
 *H04L 29/08* (2006.01)

(52) U.S. Cl.
 CPC ......... *H05B 37/0272* (2013.01); *H04L 29/06* (2013.01); *H04L 67/12* (2013.01); *H04L 69/08* (2013.01); *H05B 33/0842* (2013.01)

(58) Field of Classification Search
 None
 See application file for complete search history.

(56) References Cited

U.S. PATENT DOCUMENTS

2015/0177715 A1*  6/2015  Smith ............... H05B 37/0272
                                                                    700/90
2017/0188438 A1*  6/2017  Vollmer ............ H05B 37/0254

FOREIGN PATENT DOCUMENTS

JP          2003-151780 A      5/2003

* cited by examiner

*Primary Examiner* — Dedei K Hammond
(74) *Attorney, Agent, or Firm* — McDermott Will & Emery LLP

(57) ABSTRACT

Light control communication system includes first conversion unit, controller-side communication unit, device-side communication unit, and second conversion unit. First conversion unit converts an input signal in conformity with a first protocol used for controlling lighting device into a communication signal in conformity with a second protocol. Controller-side communication unit transmits the communication signal to device-side communication unit. Second conversion unit converts the communication signal into a control signal in conformity with the first protocol output to lighting device. First conversion unit extracts only data of a predetermined channel from channels of the input signal and converts the extracted data into the communication signal. Second conversion unit interpolates predetermined data in the communication signal to convert into the control signal.

11 Claims, 4 Drawing Sheets

FIG. 2A

| ch | |
|---|---|
| 1 | 100 |
| 2 | 152 |
| 3 | 80 |
| . | . |
| . | . |
| . | . |
| 20 | 72 |
| 21 | 40 |
| . | . |
| . | . |
| . | . |
| 512 | 60 |

FIG. 2B

| ch | |
|---|---|
| 1 | 100 |
| 2 | 152 |
| 3 | 80 |
| . | . |
| . | . |
| . | . |
| 20 | 72 |

FIG. 2C

| ch | |
|---|---|
| 1 | 100 |
| 2 | 152 |
| 3 | 80 |
| . | . |
| . | . |
| . | . |
| 20 | 72 |

FIG. 2D

| ch | |
|---|---|
| 1 | 100 |
| 2 | 152 |
| 3 | 80 |
| . | . |
| . | . |
| . | . |
| 20 | 72 |
| 21 | 0 |
| . | . |
| . | . |
| . | . |
| 512 | 0 |

FIG. 3A

|    | t1  | t2  | t3  |
|----|-----|-----|-----|
| ch |     |     |     |
| 1  | 100 | 98  | 96  |
| 2  | 152 | 152 | 152 |
| 3  | 80  | 90  | 100 |
| .  | .   | .   | .   |
| .  | .   | .   | .   |
| .  | .   | .   | .   |
| 20 | 72  | 76  | 80  |
| 21 | 40  | 80  | 120 |
| .  | .   | .   | .   |
| .  | .   | .   | .   |
| .  | .   | .   | .   |
| 512| 60  | 60  | 60  |

|    | t1  | t2  | t3  |
|----|-----|-----|-----|
| ch |     |     |     |
| 1  | 100 | 98  | 96  |
| 2  | 152 | 152 | 152 |
| 3  | 80  | 90  | 100 |
| .  | .   | .   | .   |
| .  | .   | .   | .   |
| .  | .   | .   | .   |
| 20 | 72  | 76  | 80  |

|    | t1  | t2   | t3  |
|----|-----|------|-----|
| ch |     |      |     |
| 1  | 100 | LOSS | 96  |
| 2  | 152 | LOSS | 152 |
| 3  | 80  | LOSS | 100 |
| .  | .   | .    | .   |
| .  | .   | .    | .   |
| .  | .   | .    | .   |
| 20 | 72  | LOSS | 80  |

FIG. 3D

|    | t1  | t2  | t3  |
|----|-----|-----|-----|
| ch |     |     |     |
| 1  | 100 | 98  | 96  |
| 2  | 152 | 152 | 152 |
| 3  | 80  | 90  | 100 |
| .  | .   | .   | .   |
| .  | .   | .   | .   |
| .  | .   | .   | .   |
| 20 | 72  | 76  | 80  |
| 21 | 0   | 0   | 0   |
| .  | .   | .   | .   |
| .  | .   | .   | .   |
| .  | .   | .   | .   |
| 512| 0   | 0   | 0   |

LIGHT CONTROL COMMUNICATION SYSTEM, LIGHT CONTROL COMMUNICATION METHOD AND PROGRAM

CROSS REFERENCE

This application claims the benefit of Japanese Application No. 2017-243398 filed on Dec. 20, 2017, the entire content of which is hereby incorporated by reference.

BACKGROUND

1. Technical Field

The present disclosure relates to a communication system configured to control a lighting device, a communication method for controlling the lighting device, and a program that executes the communication method.

2. Description of the Related Art

A stage direction lighting system is configured to send a control signal from a light control device such as a light control console to each lighting device based on a communication protocol of DMX512 standard. A light control system configured to send a signal of DMX512 standard to each lighting device as a control signal over the wireless has been developed (for example, PTL 1).

The light control system according to PTL 1 includes a light control console, a transmission device connected to the light control console, a receiving device connected to the transmission device, and a lighting device connected to the receiving device. The transmission device converts a control signal of DMX512 standard, which is a first protocol output from the light control console, into a signal of, for example, Ethernet (registered trademark) standard, which is a second protocol, and transmits the signal of the second protocol to the receiving device. The receiving device re-converts the signal of the second protocol into the signal of DMX512 standard and outputs the signal of DMX512 standard to the lighting device.

CITATION LIST

Patent Literature

PTL 1: Unexamined Japanese Patent Publication No. 2003-151780

SUMMARY

When many devices compatible with communication via a wireless device or a power line are present, communication achieved over the wireless or via a power line may have low throughput compared with communication via dedicated cables of, for example, DMX512 standard. Therefore, when a signal of DMX512 standard is converted into a signal of a communicable form over the wireless or via the power line and transmitted as is, data loss and the like may result.

The present disclosure is provided to solve the above-described problem. It is an object of the present disclosure is to provide a light control communication system configured to minimize a data loss even when a signal of DMX512 standard or the like is converted once into a signal of a communicable form over the wireless or via a power line and then is re-converted into the signal of DMX512 standard or the like.

It is also an object of the present disclosure is to provide a light control communication method configured to reduce a data loss even when a signal of DMX512 standard or the like is converted into a signal of a communicable form once over the wireless or via a power line and then is re-converted into the signal of DMX512 standard or the like. Furthermore, it is an object of the present disclosure to provide a program for executing the light control communication method.

In order to solve the above-described object, a light control communication system according to the present disclosure includes: a first conversion unit configured to convert an input signal in conformity with a first protocol used for controlling a lighting device into a communication signal in conformity with a second protocol; a controller-side communication unit configured to transmit the communication signal; a device-side communication unit configured to receive the communication signal from the controller-side communication unit; and a second conversion unit configured to convert the communication signal received by the device-side communication unit into a control signal in conformity with the first protocol, in which each of the input signal and the control signal includes a first number of channels, the first number of predetermined channels includes a second number of predetermined channels including data for controlling the lighting device, the second number being smaller than the first number, the first conversion unit extracts only data included in the second number of predetermined channels from the first number of predetermined channels in the input signal as data included in the communication signal, and the second conversion unit generates the control signal by adding predetermined data to the data included in the communication signal to fill the first number of channels.

A light control communication method according to the present disclosure includes: a first converting step for converting an input signal in conformity with a first protocol used for controlling a lighting device into a communication signal in conformity with a second protocol; a transmitting step for transmitting the communication signal; a receiving step for receiving the communication signal transmitted; and a second converting step for converting the communication signal received in the receiving step into a control signal in conformity with the first protocol, in which each of the input signal and the control signal includes a first number of channels, the first number of predetermined channels include a second number of predetermined channels including data for controlling the lighting device, the second number being smaller than the first number, the first converting step includes extracting only data included in the second number of predetermined channels from the first number of predetermined channels in the input signal as data included in the communication signal, and the second converting step includes generating the control signal by adding predetermined data to the data included in the communication signal to fill the first number of channels.

A program according to the present disclosure causes a computer to execute a light control communication method, the method including: a first converting step for converting an input signal in conformity with a first protocol used for controlling a lighting device into a communication signal in conformity with a second protocol; a transmitting step for transmitting the communication signal; a receiving step for receiving the communication signal transmitted in the transmitting step; and a second converting step for converting the communication signal received in the receiving step into a control signal in conformity with the first protocol, in which each of the input signal and the control signal includes a first number of channels, the first number of predetermined channels includes a second number of predetermined channels including data for controlling the lighting device, the second number being smaller than the first number, the first converting step includes extracting only data included in the second number of predetermined channels from the first number of predetermined channels in the input signal as data included in the communication signal, and the second converting step includes generating the control signal by adding predetermined data to the data included in the communication signal to fill the first number of channels.

With the light control communication system according to the present disclosure, a data loss may be reduced even when a signal of DMX512 standard or the like is converted once into a signal of a communicable form over the wireless or via a power line and then is re-converted into the signal of DMX512 standard or the like.

With the light control communication method according to the present disclosure, a data loss may be reduced even when a signal of DMX512 standard or the like is converted once into a signal of a communicable form over the wireless or via a power line and then is re-converted into the signal of DMX512 standard or the like.

By causing a computer to execute the program according to the present disclosure, a data loss may be reduced even when a signal of DMX512 standard or the like is converted once into a signal of a communicable form over the wireless or via a power line and then is re-converted into the signal of DMX512 standard or the like.

BRIEF DESCRIPTION OF THE DRAWINGS

FIG. 2A is a schematic drawing illustrating an example of signal conversion performed by the light control communication system according to the first exemplary embodiment;

FIG. 2B is a schematic drawing illustrating an example of signal conversion performed by the light control communication system according to the first exemplary embodiment;

FIG. 2C is a schematic drawing illustrating an example of signal conversion performed by the light control communication system according to the first exemplary embodiment;

FIG. 2D is a schematic drawing illustrating an example of signal conversion performed by the light control communication system according to the first exemplary embodiment;

FIG. 3A is a schematic drawing illustrating an example of signal conversion performed by the light control communication system according to the first exemplary embodiment;

FIG. 3B is a schematic drawing illustrating an example of signal conversion performed by the light control communication system according to the first exemplary embodiment;

FIG. 3C is a schematic drawing illustrating an example of signal conversion performed by the light control communication system according to the first exemplary embodiment;

FIG. 3D is a schematic drawing illustrating an example of signal conversion performed by the light control communication system according to the first exemplary embodiment.

DETAILED DESCRIPTION

Figure 1:
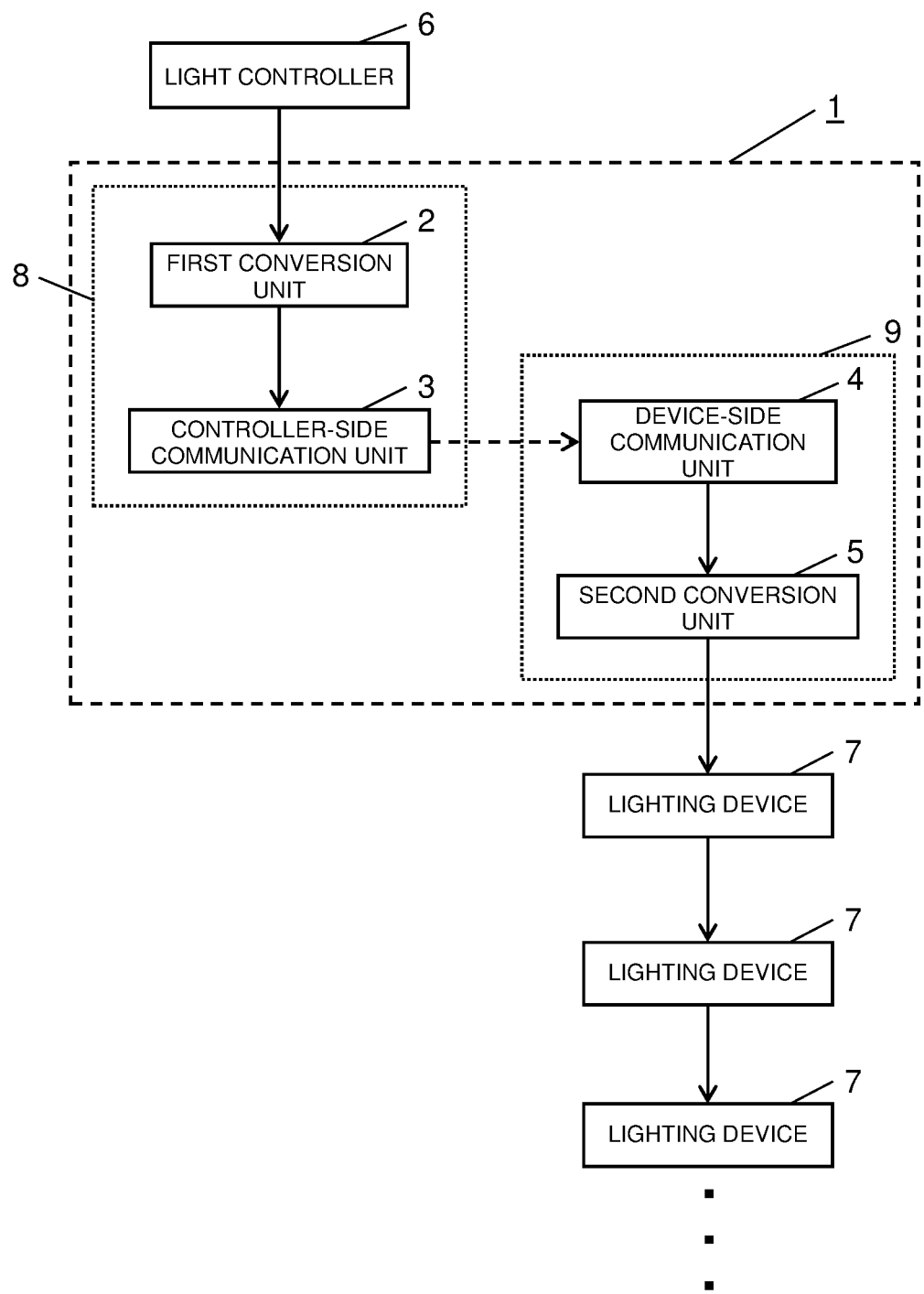
FIG. 1 is a block diagram illustrating an example of a light control communication system according to a first exemplary embodiment.

A light control communication system, a light control communication method and a program according to exemplary embodiments will be described in detail below with respect to drawings. Any exemplary embodiments described below illustrate examples of the present disclosure only. Numeric values, components, and actions are also examples only, and are not intended to limit the present disclosure.

The drawings are schematically illustrated and thus are not strictly accurate. In the drawings, substantially identical configurations are denoted by identical reference numerals, and overlapped description may be omitted or simplified.

First Exemplary Embodiment

Figure 4:
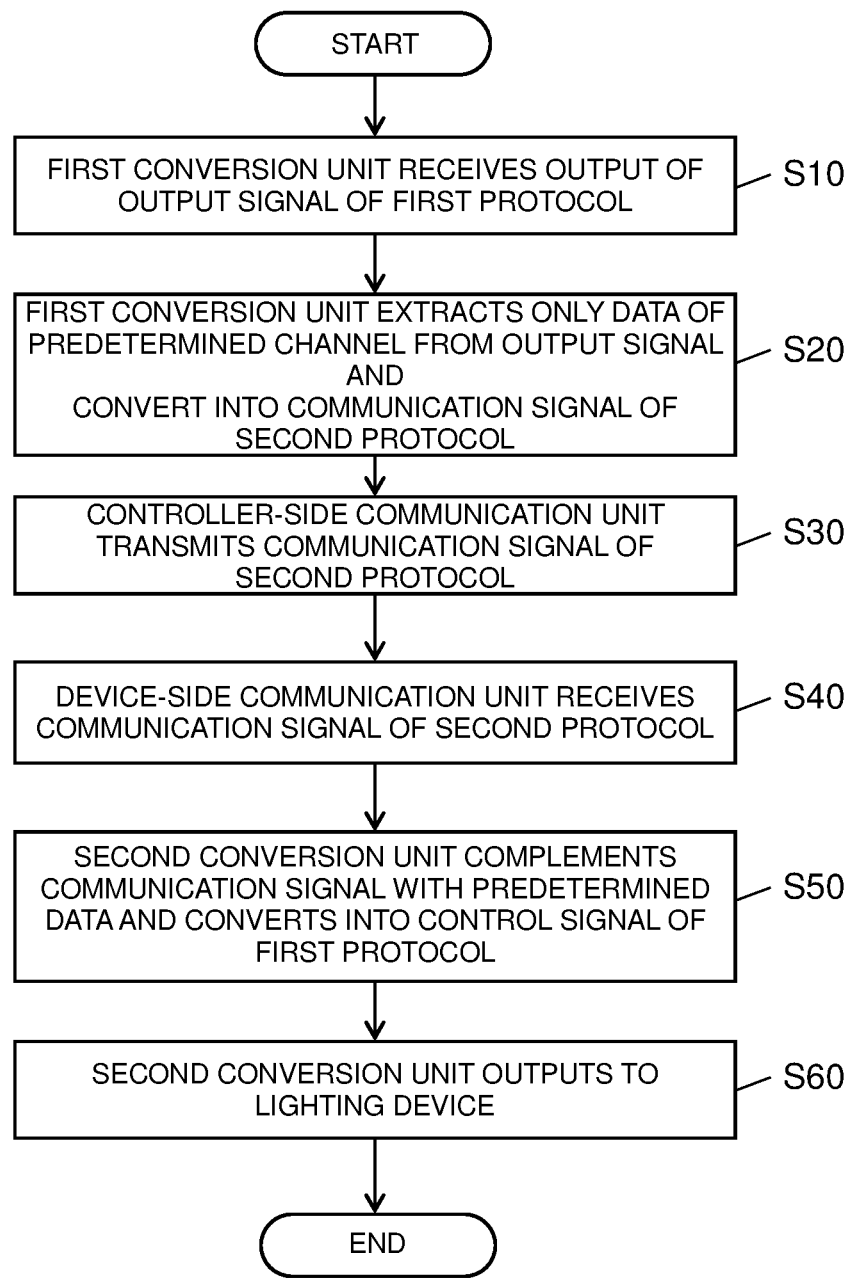
FIG. 4 is a flowchart illustrating an example of an action of the light control communication system according to the first exemplary embodiment.

Referring now to FIGS. 1 to 4, light control communication system 1 according to a first exemplary embodiment will be described. FIG. 1 is a block diagram illustrating an example of a light control communication system according to the first exemplary embodiment. FIGS. 2A to 2D are schematic drawings illustrating an example of signal conversion performed by the light control communication system according to the first exemplary embodiment. FIGS. 3A to 3D are schematic drawings illustrating an example of the signal conversion performed by the light control communication system according to the first exemplary embodiment. FIG. 4 is a flowchart illustrating an example of an action of the light control communication system according to the first exemplary embodiment.

More specifically, FIG. 2A is a drawing schematically illustrating an example of an input signal output from a light controller. FIG. 2B is a drawing schematically illustrating an example of a communication signal converted from the input signal by a first conversion unit. FIG. 2C is a drawing schematically illustrating an example of a communication signal received by a device-side communication unit. FIG. 2D is a drawing illustrating an example of a control signal converted from the communication signal by a second conversion unit.

FIG. 3A is a drawing schematically illustrating an example of an input signal output from a light controller. FIG. 3B is a drawing schematically illustrating an example of a communication signal converted from the input signal by a first conversion unit. FIG. 3C is a drawing schematically illustrating an example of the communication signal received by the device-side communication unit. FIG. 3D is a drawing illustrating an example of a control signal converted from the communication signal by a second conversion unit.

Configuration

Light control communication system 1 is used, for example, for controlling stage direction lighting outdoor. Light control communication system 1 includes first conversion unit 2, controller-side communication unit 3, device-side communication unit 4, and second conversion unit 5. Light control communication system 1 converts an input signal in conformity with a first protocol output from light controller 6 into a communication signal in conformity with a second protocol, and converts the communication signal into a control signal in conformity with the first protocol, and then outputs the control signal to each of lighting devices 7. More specifically, in light control communication system 1, first conversion unit 2 and controller-side communication unit 3 are provided near light controller 6, and device-side communication unit 4 and second conversion unit 5 are provided near lighting devices 7.

Light controller 6 generates an input signal in conformity with the first protocol for controlling each of lighting devices 7 and transmits the input signal to first conversion unit 2 via a dedicated cable.

First conversion unit 2 converts the input signal received from light controller 6 into a communication signal in conformity with the second protocol. At this time, first conversion unit 2 may extract data only from channels of the input signal used by lighting devices 7 and convert the extracted data into a communication signal.

Controller-side communication unit 3 transmits the communication signal converted by first conversion unit 2 to device-side communication unit 4 over the wireless or by a power line.

Device-side communication unit 4 outputs the communication signal received from controller-side communication unit 3 to second conversion unit 5.

Second conversion unit 5 receives the communication signal in conformity with the second protocol from device-side communication unit 4 and converts into a control signal in conformity with the first protocol. At this time, second conversion unit 5 may fill dummy data in channels that are not used by any of lighting devices 7 as appropriate. Alternatively, second conversion unit 5 may convert the communication signal into a control signal by using only data of channels extracted by first conversion unit 2. In other words, the control signal is required to include the data of the channels extracted by the first conversion unit 2, but does not have to include the dummy data. In this case, a number of channels of the control signal is smaller than a number of channels of the input signal. Second conversion unit 5 transmits the control signal to each of lighting devices 7 via a dedicated cable.

Each of lighting devices 7 operates according to the control signal in conformity with the first protocol and received from the second conversion unit 5.

As used in the first exemplary embodiment the term "signal in conformity with the first protocol" is intended to mean a signal in conformity with DMX512 standard. Alternatively, a signal may follow a communication standard derived from DMX512 standard.

The signal in conformity with DMX512 standard includes a plurality of packets arranged in time series at regular communication intervals. One packet includes a first number of predetermined channels from 512 channels from 1 ch to 512 ch. In the first exemplary embodiment, one packet includes 512 channels. One channel includes one piece of data. One piece of data indicates one setting (for example, one of dimming, toning, and a lighting direction) of one lighting device 7. DMX512 standard specifies transmission of a packet having a fixed length at a fixed bit rate.

Each of lighting devices 7 is allocated with a channel of a signal of DMX512 standard to be used. Each of lighting devices 7 reads data of a channel allocated to the corresponding lighting device 7 from a received signal of DMX512 standard and operates according to the data.

Signals in conformity with the second protocol may be signals that are transmittable over the wireless or via a power line. For example, universal LAN standard such as Ethernet (Registered Trademark) may be used as the second protocol. In the first exemplary embodiment, the second protocol is LAN standard. LAN standard allows transmission using variable bit rate of a variable length packet.

Light Controller

Light controller 6 outputs an input signal in conformity with DMX512 standard, which is a first protocol for controlling each of lighting devices 7. In the first exemplary embodiment, light controller 6 is a light control console. Light controller 6 is only required to be capable of outputting a signal for controlling light in conformity with the first protocol and, for example, may be a personal computer or a tablet.

A user may operate an operation unit (not illustrated) of light controller 6 to set dimming, toning, and irradiating direction of each of the plurality of lighting devices 7. Data on setting of each of lighting devices 7 set by light controller 6 is transmitted through a channel corresponding to each of lighting devices 7 of the signal of DMX512 standard.

First Conversion Unit

First conversion unit 2 converts an input signal in conformity with DMX512 standard, which is the first protocol, output from the light controller 6 into a communication signal in conformity with LAN standard, which is the second protocol. First conversion unit 2 transmits the communication signal to controller-side communication unit 3. First conversion unit 2 is only required to be capable of processing signals, and thus a processor such as a Central Processing Unit (CPU) may be used. First conversion unit 2 is preferably provided with a memory.

First conversion unit 2 extracts only data of a second number of predetermined channels, which is smaller than a first number, from the signal of DMX512 standard, which is a first protocol, as data included in the communication signal. The channels allocated to any one of lighting devices 7 are determined in advance as channels for extracting data. In addition, channels which are not allocated to any one of lighting devices 7 may be determined in advance as channels for extracting data.

For example, assuming that there are five lighting devices 7, and each of lighting devices 7 uses four channels, the number of channels to be used by the lighting devices 7 is twenty. When twenty channels from 1 ch to 20 ch are used from 512 channels included in the input signal, channels from 1 ch to 20 ch are specified as channels for extracting data in advance. In this case, as illustrated in FIG. 2B, data of channels from 1 ch to 20 ch are extracted. In this case, channels from 1 ch to 25 ch may be specified as channels for extracting data in advance. Channels from 1 ch to 20 ch are actually used by lighting devices 7. Channels from 21 ch to 25 ch are not used by any of lighting devices 7.

Channels allocated for lighting devices 7 may be channels from 10 ch to 30 ch without including leading channels 1 ch to 9 ch. In such a case, channels from 10 ch to 30 ch may be set as channels to be extracted by first conversion unit 2. Alternatively, in this case, channels including the leading channel, that is, from 1 ch to 30 ch may be set as channels to be extracted by first conversion unit 2.

The channels allocated to lighting devices 7 may be discontinuous such as channels from 1 ch to 5 ch and from 15 ch to 25 ch. In such a case, channels from 1 ch to 25 ch may be set as channels to be extracted by first conversion unit 2. Alternatively, in this case, channels from 1 ch to 5 ch and from 15 ch to 25 ch may be set as channels to be extracted by first conversion unit 2.

The input signal may be transmitted by a dedicated cable for signals of DMX512 standard. In contrast, the communication signals are transmitted over the wireless or via a power line, which may have lower throughput than transmission via the dedicated cable. Therefore, the amount of data to be included in the communication signal may be reduced by extracting only data of predetermined channels from the input signal. Accordingly, data loss during transmission over the wireless or via a power line may be reduced.

The input signal follows DMX512 standard. The communication signal follows LAN standard. Signals in conformity with LAN standard include an IP packet having a header portion and a data portion. First conversion unit 2 puts, for example, data extracted from the input signal in a data portion of the IP packet. Accordingly, the input signal is converted into the communication signal.

Controller-Side Communication Unit

Controller-side communication unit 3 transmits the communication signal received from first conversion unit 2 to device-side communication unit 4.

Device-Side Communication Unit

Device-side communication unit 4 receives a communication signal transmitted by controller-side communication unit 3. In the first exemplary embodiment, device-side communication unit 4 and controller-side communication unit 3 communicate over the wireless. For example, Wi-Fi (registered trademark) may be used as a wireless communication standard. Note that device-side communication unit 4 and controller-side communication unit 3 may be configured to be communicated by wire.

In the first exemplary embodiment, controller-side communication unit 3 performs only transmission to device-side communication unit 4, and device-side communication unit 4 performs only reception from controller-side communication unit 3. However, controller-side communication unit 3 and device-side communication unit 4 may be configured to perform transmission and reception with each other. For example, device-side communication unit 4 may be configured to transmit a signal indicating completion of reception to controller-side communication unit 3 when device-side communication unit 4 receives a communication signal.

Second Conversion Unit

Second conversion unit 5 converts the communication signal in conformity with LAN standard into the control signal in conformity with DMX512 standard. Second conversion unit 5 further transmits the control signal to each of lighting devices 7. Second conversion unit 5 is only required to be capable of processing signals, and thus a processor such as a CPU may be used. Second conversion unit 5 is preferably provided with a memory.

The communication signal only includes data of predetermined channels from all the channels included in the input signal. Data of channels other than predetermined channels from all the channels included in the input signal is not available for second conversion unit 5. In contrast, the control signal includes the same number of channels as the input signal. In other words, the control signal includes channels corresponding to the predetermined channels in the input signal (extracted channels) and channels corresponding to channels other than the predetermined channels in the input signal (non-extracted channels). Second conversion unit 5 allocates data included in the communication signal to the channels corresponding to the extracted channels from the channels included in the control signal. Second conversion unit 5 further fills the predetermined data in the channels corresponding to the non-extracted channels from the channels included in the control signal. As used herein the term "predetermined data" is intended to include, for example, a dummy data and data "0" as a numerical value.

Specifically, second conversion unit 5 allocates one or more data included in the communication signal to channels in sequence from the leading channel 1 ch of the control signal. Second conversion unit 5 then fills the predetermined data in channels not allocated with data.

For example, as illustrated in FIG. 2B and FIG. 2C, when first conversion unit 2 extracts data from twenty channels from 1 ch to 20 ch in the input signal, second conversion unit 5 allocates the twenty pieces of data included in the communication signal respectively to the channels from 1 ch to 20 ch in the control signal as illustrated in FIG. 2D. Second conversion unit 5 then fills the predetermined data in each of the channels from 21 ch to 512 ch in the control signal.

When first conversion unit 2 extracts data of fifteen channels from 11 ch to 25 ch in the input signal, second conversion unit 5 allocates fifteen pieces of data included in the communication signal respectively to channels 1 ch to 15 ch in the control signal. Second conversion unit 5 fills the predetermined data in each of the channels from 16 ch to 512 ch in the control signal. In this example, data of 11 ch in the input signal is allocated to 1 ch in the control signal. In this manner, channel numbers to be allocated to each piece of data are different between the input signal and the control signal. Light controller 6 may be provided with a correspondence table indicating correspondence between channels in the input signal and channels in the control signal and may be configured to generate the input signal based on the correspondence table to achieve delivery of adequate data to intended lighting device 7.

Alternatively, when first conversion unit 2 extracts data of fifteen channels from 1 ch to 5 ch and from 11 ch to 15 ch in the input signal, second conversion unit 5 allocates fifteen pieces of data included in the communication signal respectively to channels 1 ch to 10 ch in the control signal. Second conversion unit 5 fills the predetermined data in each of the channels from 11 ch to 512 ch in the control signal.

Second conversion unit 5 may allocate the data included in the communication signal to channels in the control signal having the same channel numbers as channels in the input signal. In this case, first conversion unit 2 may add information on channel numbers of extracted channels in the communication signal. Second conversion unit 5 may refer to information on the channel numbers included in the communication signal and allocate the data included in the communication signal to channels in the control signal.

Specifically, when first conversion unit 2 extracts data of twenty channels from 1 ch to 20 ch in the input signal, second conversion unit 5 allocates fifteen pieces of data included in the communication signal respectively to channels 1 ch to 20 ch in the control signal. Second conversion unit 5 fills the predetermined data in each of the channels from 21 ch to 512 ch in the control signal.

When first conversion unit 2 extracts data of fifteen channels from 10 ch to 25 ch in the input signal, second conversion unit 5 allocates fifteen pieces of data included in the communication signal respectively to channels 10 ch to 25 ch in the control signal. Second conversion unit 5 fills the predetermined data in each of the channels from 1 ch to 9 ch and from 26 ch to 512 ch in the control signal.

Alternatively, when first conversion unit 2 extracts data of fifteen channels from 1 ch to 5 ch and from 10 ch to 15 ch in the input signal, second conversion unit 5 allocates fifteen pieces of data included in the communication signal respectively to channels 1 ch to 5 ch and from 10 ch to 15 ch in the control signal. Second conversion unit 5 fills the predetermined data in each of the channels from 6 ch to 9 ch and from 16 ch to 512 ch in the control signal.

By filling the predetermined data in channels corresponding to the channels having no data extracted by first conversion unit 2, control signal including the same number of channels as in the input signal may be generated. The communication signal only includes data of a smaller number of channels than the number of all the channels included in the input signal. An amount of data of such communication signal is smaller than an amount of data of the communication signal including data of all the channels included in the input signal. Therefore, even when the communication signal is transmitted by a communication system that may have a lower throughput (for example, wireless communication or power line communication), a data loss may be reduced. In other words, for example, the data loss may be reduced even when a signal of DMX512 standard is converted once into a signal of a communicable form over the wireless and then is re-converted into the signal of DMX512 standard.

The input signal output from the light controller 6 includes a plurality of packets arranged in time series at regular communication intervals. The control signal output from the second conversion unit 5 includes a plurality of packets arranged in time series at regular communication intervals. The communication intervals of the packets in the control signal are preferably identical to the communication intervals of the packets in the input signal for smooth control of the lighting devices 7 for stage direction lighting. Controller-side communication unit 3 transmits the communication signal in conformity with LAN standard to device-side communication unit 4. Communication of LAN standard may have a lower throughput than communication of DMX512 standard.

Therefore, communication intervals of IP packets in the communication signal may be larger than the communication intervals of the packets in the input signal. In such a case, second conversion unit 5 may fail to receive IP packets at adequate timings (see FIG. 3C), and thus a packet loss may occur in the control signal.

A case where the packet loss occurs will be described more detail with reference to FIG. 3A to FIG. 3D. In FIG. 3A, t1 indicates a reference time point, t2 indicates a time point after one communication interval of the packets in the input signal has elapsed from the reference time point t1, and t3 indicates a time point after two communication intervals of the packets in the input signal has elapsed from the reference time point t1. For example, when the communication intervals of the packets in the input signal are every 100 milliseconds, t2 is 100 milliseconds after t1, and t3 is 200 milliseconds after t1.

First conversion unit 2 receives packets 11, 12, and 13 of the input signal respectively at time points t1, t2, and t3 (see FIG. 3A). First conversion unit 2 generates IP packets 21 22, and 23 of the communication signal, corresponding respectively to packets 11, 12, and 13 of the input signal (see FIG. 3B). No packet loss occurs in the control signal if device-side communication unit 4 receives packets 22 and 23 respectively 100 milliseconds and 200 milliseconds after a reception of IP packet 21. However, if device-side communication unit 4 receives IP packets 22 and 23 respectively 180 milliseconds and 200 milliseconds after the reception of IP packet 21, a communication interval between IP packet 21 and IP packet 22 exceeds a communication interval between packet 11 and packet 12.

In this manner, when second conversion unit 5 cannot receive IP packet 22 at an adequate timing, for example, second conversion unit 5 cannot receive the IP packet 22 as illustrated in FIG. 3C (time point t2). The packet loss of the control signal occurs in such a case.

In addition, when other wireless devices are present in the periphery, communication between controller-side communication unit 3 and device-side communication unit 4 may interfere with communication of the other devices. When device-side communication unit 4 fails to receive IP packets due to such interference, the packet loss as illustrated in FIG. 3C may occur even when the communication intervals of the IP packets in the communication signal match the communication intervals of the packets in the input signal.

When such a packet loss occurs, second conversion unit 5 adds the packet in the control signal to make the communication intervals of the packets in the control signal match the communication intervals of the packets in the input signal.

Information on the communication intervals of the packets in the input signal is preferably stored in advance in a memory of second conversion unit 5 because second conversion unit 5 uses the information on the communication intervals of the packets in the input signal. Alternatively, first conversion unit 2 may generate the communication signal including the information on the communication intervals of the packets in the input signal.

The method of addition of the packets to be performed in such a case in the first exemplary embodiment includes adding the same number of packets as the number of lost packets during a lost period having the packet loss. The packets to be added include data such that the value of data varies proportionally between packets before and after the lost period. For example, as illustrated in 1 ch in FIG. 3D, numeric data of the packets before and after the lost period are "100" (t1) and "96" (t3) respectively, and when the number of the lost packets is one, second conversion unit 5 complements one packet (t2) having a value of "98".

When the numeric values of data of packets before and after the lost period are respectively "83" and "95", and the number of the lost packets are three, second conversion unit 5 adds three packets having numeric data of "86", "89", and "92" in sequence.

When the addition as described above is performed, second conversion unit 5 is required to receive a packet immediately after the lost packet. After a predetermined time longer than the communication intervals of the packets in the input signal has elapsed after reception of the packets in the control signal, second conversion unit 5 converts the packets in the communication signal into packets in the control signal.

The method of adding the packet is not limited to the method described above. For example, the packet to be added may have data that maintains the data of the packet immediately before the lost period until the packet immediately after the lost period.

For example, when the numeric value of the data of the packet immediately before the lost period is "102", and the number of the lost packets is one, second conversion unit 5 adds one packet having numeric data of "102".

Likewise, when the numeric value of the data of the packet immediately before the lost period is "83" and the number of the lost packets is three, second conversion unit 5 adds three packets having the numeric data of "83", "83", and "83" in sequence.

In addition, the method of adding the packet is not limited to the methods described above. For example, the packet to be added may have data having the data values changing proportionally between the packet immediately before the lost period and a packet two packets before the lost period.

For example, when the numeric value of data of the packet two packets before the lost period and the packet immediately before the lost period are respectively "108"

and "102", and the number of the lost packets is one, second conversion unit 5 adds a packet having a numeric value of "96".

Likewise, when the numeric value of data of the packet two packets before the lost period and the packet immediately before the lost period are respectively "96" and "98", and the number of lost packets is three, second conversion unit 5 adds three packets having numeric data of "94", "92", and "90" in sequence.

As described above, by adding the lost packets, the packet loss may be reduced even when the light control is performed by the signal of DMX512 standard, which is the first protocol, via wireless communication. In other words, the packet loss may be reduced even when a signal of DMX512 standard is converted once into a signal of a communicable form over the wireless and then is re-converted into the signal of DMX512 standard.

Note that a case where the loss occurs only on data of some of channels may be conceivable though illustration in FIG. 3C indicates that the data loss occurs on data of all the channels included in the packet. Even when the loss occurs only on data of some of channels, second conversion unit 5 may add the packet in the same manner as descried above.

In the first exemplary embodiment, second conversion unit 5 adds the predetermined data in channels corresponding to channels that have no data extracted by first conversion unit 2. After that, second conversion unit 5 adds the packet loss. However, the order of addition to be performed by second conversion unit 5 is not limited to the order described above, and may be the opposite. In other words, second conversion unit 5 may add the predetermined data in the channels corresponding to the channels having no data extracted by first conversion unit 2 after the addition for the packet loss.

Lighting Device

In the first exemplary embodiment, lighting devices 7 are stage direction lighting installed outdoor. Note that light control communication system 1 may also be used not only for controlling the lighting devices 7 installed outdoor, but also for controlling the lighting devices 7 installed indoor. Light control communication system 1 may also be used not only for controlling the stage direction lighting, but also for controlling lighting of, for example, signboards or displays that repeats light emission at a periodic pattern.

A Light source of the lighting device 7 in the first exemplary embodiment is a light emitting diode (LED). The light source of the lighting device 7 is not limited to the LED, but may be a halogen lamp or a laser diode, for example. Light control communication system 1 is capable of controlling a plurality of the lighting devices 7, but may be used for controlling only one lighting device 7.

Operation

Referring now to a flowchart in FIG. 4, an operation of light control communication system 1 according to the first exemplary embodiment will be described below.

First conversion unit 2 receives an input of an input signal of DMX512 standard, which is the first protocol, output from the light controller 6 (S10). First conversion unit 2 extracts only data of the predetermined channels from the input signal, and converts the extracted data to the communication signal of LAN standard, which is the second protocol (S20). The channels used by any one of lighting devices 7 are specified in advance as channels for extracting data. In addition, channels which are not used by any one of lighting devices 7 may be specified in advance as channels for extracting data.

For example, in S20, conversion from the input signal illustrated in FIG. 2A to the communication signal illustrated in FIG. 2B is performed. In the examples illustrated in FIG. 2A and FIG. 2B, the lighting device 7 uses channels 1 ch to 20 ch of a signal of DMX512 standard. First conversion unit 2 extracts data from 1 ch to 20 ch of the input signal and converts the extracted data into the communication signal.

The communication signal converted by first conversion unit 2 is transmitted by controller-side communication unit 3 over the wireless or via a power line (S30). The communication signal transmitted by controller-side communication unit 3 is received by device-side communication unit 4 (S40). The communication signal received by device-side communication unit 4 is output to second conversion unit 5.

Second conversion unit 5 converts the communication signal into the control signal of DMX512 standard, which is the first protocol, by adding the predetermined data in the communication signal of LAN standard, which is the second protocol (S50). Here, second conversion unit 5 adds the predetermined data in channels corresponding to channels that have no data extracted by first conversion unit 2. As used herein the term "predetermined data" is intended to include, for example, a dummy data and data "0" as a numerical value.

For example, in S50, conversion from the communication signal illustrated in FIG. 2C to the control signal illustrated in FIG. 2D is performed. In the examples illustrated in FIG. 2C and FIG. 2D, second conversion unit 5 allocates respective data of the channels from 1 ch to 20 ch of the communication signal to the channels from 1 ch to 20 ch of the control signal. Second conversion unit 5 further adds channels having no data allocated with "0" as dummy data.

Since controller-side communication unit 3 and device-side communication unit 4 perform transmission and reception in conformity with the LAN standard, which may have a lower throughput than DMX512 standard, a packet loss may occur in the transmission and reception between controller-side communication unit 3 and device-side communication unit 4.

As used herein the term "packet loss" is intended to mean that the communication intervals between adjacent packets in the control signal in time series converted from the communication signals become larger than the communication intervals between adjacent packets in the input signal in time series.

When such a packet loss occurs, second conversion unit 5 adds a packet in the control signal to make the communication intervals of the packets in the control signal match the communication intervals of the packets in the input signal. The packets to be added include data such that the value of data varies proportionally from data of the packets before and after the packet lost period.

For example, in S50, conversion from the communication signal illustrated in FIG. 3C to the control signal illustrated in FIG. 3D is performed. In the example illustrated in FIG. 3C and FIG. 3D, for example, data of the packets before and after the lost period in 1 ch, for example, are respectively "100" and "96". Second conversion unit 5 adds a packet in the lost period having data of "98".

Note that the addition of packet to be performed when a loss occurs is not limited to the addition described above. The packet to be added may have data that maintains the data of the packet immediately before the lost period until the packet immediately after the lost period. Alternatively, the packet to be added may have data having the data values changing proportionally between data of the packet immediately before the lost period and data of a packet two packets before the lost period.

In Step S50, the control signal of DMX512 standard, which is the first protocol, converted by second conversion unit 5 is output to each of lighting devices 7 (S60). Each of lighting devices 7 reads data of a channel allocated to the corresponding lighting device 7 from an input control signal to perform an operation in accordance with the data of the control signal.

Advantageous Effects of Light Control Communication System According to Exemplary Embodiment Here, an essential point of light control communication system 1 according to a first exemplary embodiment will be described again.

Light control communication system 1 according to the first exemplary embodiment includes first conversion unit 2, controller-side communication unit 3, device-side communication unit 4, and second conversion unit 5. First conversion unit 2 converts the input signal, which is in conformity with the first protocol used for controlling the lighting devices 7 into the communication signal in conformity with the second protocol. Controller-side communication unit 3 transmits the communication signal. Device-side communication unit 4 receives the communication signal from controller-side communication unit 3. Second conversion unit 5 converts the communication signal received by device-side communication unit 4 into the control signal, which is in conformity with the first protocol. Each of the input signal and the control signal includes a first number of channels. The first number of channels include a second number, which is smaller than the first number, of predetermined channels including data for controlling the lighting devices 7. First conversion unit 2 extracts only data included in the second number of predetermined channels from the first number of channels of the input signal as data to be included in the communication signal. Second conversion unit 5 generates the control signal by adding predetermined data to the data included in the communication signal to fill the first number of channels.

With the light control communication system 1 having the configuration described above, the data loss may be reduced even when the signal of DMX512 standard is converted once into the signal of the communicable form over the wireless or via the power line and then is re-converted into the signal of DMX512 standard.

In addition, in light control communication system 1 according to the first exemplary embodiment, second conversion unit 5 preferably adds the predetermined data in channels of the control signal corresponding to channels of the input signal having no data extracted by first conversion unit 2.

As described above, by adding the predetermined data in the channels of the control signal corresponding to the channels having no data extracted by first conversion unit 2, the data loss may be reduced even when the lighting control is performed with the signal of DMX512 standard, which is the first protocol, via the wireless communication for example. In other words, the data loss may be reduced even when a signal of DMX512 standard is converted once into a signal of a communicable form over the wireless and then is re-converted into the signal of DMX512 standard, for example.

In light control communication system 1 according to the first exemplary embodiment, second conversion unit 5 preferably adds packets to make the communication intervals of the packets in the control signal match the communication intervals of the packets in the input signal when a data loss occurs in the communication signal received by device-side communication unit 4. As used herein the term "data loss" is intended to mean that the communication intervals of the packets in the control signal converted from the communication signal become larger than the communication intervals of the packets in the input signal. The signal in conformity with the first protocol includes a plurality of the packets arranged at regular communication intervals in time series.

The method of adding the packets in the packet lost period to be performed by the light control communication system 1 of the first exemplary embodiment to make the communication intervals of the control signal match the communication intervals of the input signal includes, for example, three methods described below. As used herein the term the "packet lost period" is intended to mean a period in which the communication intervals of the packets in the input signal do not match the packet intervals of the control signal.

For example, light control communication system 1 according to the first exemplary embodiment may add packets having data that makes data vary proportionally between data of the packets before and after the packet lost period. Alternatively, light control communication system 1 according to the first exemplary embodiment may add packets having data that makes data vary proportionally between data of the packets before and after the packet lost period. Alternatively, light control communication system 1 according to the first exemplary embodiment may add packets having data that makes data vary proportionally between data of the packet immediately before the packet lost period and the packet two packets before the packet lost period.

As described above, by performing addition for the packet loss, the packet loss may be reduced even when the light control is performed by the signal of DMX512 standard, which is the first protocol, via wireless communication. In other words, the packet loss may be reduced even when a signal of DMX512 standard is converted once into a signal of a communicable form over the wireless and then is re-converted into the signal of DMX512 standard, for example.

In light control communication system 1 according to the first exemplary embodiment, controller-side communication unit 3 preferably transmits the communication signal to device-side communication unit 4 over the wireless or via a power line.

A signal cable of DMX512 standard is relatively thick and thus design properties may be impaired when exposed. With the configuration described above, the signal cable of DMX512 standard does not have to be used for connecting controller-side communication unit 3 and device-side communication unit 4. Therefore, impairment of design properties is prevented.

In addition, in light control communication system 1 according to the first exemplary embodiment, the signal in conformance with the first protocol is preferably the signal in conformance with DMX512 standard.

With the configuration described above, the plurality of lighting devices 7 may be controlled by using the signal of DMX512 standard suitable for controlling the lighting devices 7.

Other Exemplary Embodiments

Light control communication system 1 according to the present disclosure has been described with reference to the first exemplary embodiment. However, the present invention is not limited to light control communication system 1 according to the first exemplary embodiment. For example, the present disclosure is effective for the light control communication method and the program as well.

The light control communication method according to the exemplary embodiment includes a first converting step, a transmitting step, a receiving step, and a second converting step. In the first converting step, an input signal, which is in conformity with the first protocol used for controlling the lighting device is converted into a communication signal in conformity with the second protocol. In the transmitting step, the communication signal is transmitted. In the receiving step, the communication signal transmitted in the transmitting step is received. In the second converting step, the communication signal received in the receiving step is converted into a control signal in conformity with the first protocol. Each of the input signal and the control signal includes a first number of channels. The first number of channels include a second number, which is smaller than the first number, of predetermined channels including data for controlling the lighting devices. In the first converting step, only data included in a second number of predetermined channels from the first number of channels of the input signal is extracted as data to be included in the communication signal. In the second converting step, the control signal is generated by adding predetermined data to the data included in the communication signal to fill the first number of channels.

With the light control communication method having the configuration described above, the data loss may be reduced even when the signal of DMX512 standard is converted once into the signal of the communicable form over the wireless or via the power line and then is re-converted into the signal of DMX512 standard.

The program according to the exemplary embodiment makes a computer execute a light control communication method including a first converting step, a transmitting step, a receiving step, a second converting step. In the first converting step, the input signal, which is in conformity with the first protocol used for controlling the lighting device is converted into the communication signal in conformity with the second protocol. In the transmitting step, the communication signal is transmitted. In the receiving step, the communication signal transmitted in the transmitting step is received. In the second converting step, the communication signal received in the receiving step is converted into a control signal in conformity with the first protocol. Each of the input signal and the control signal includes a first number of predetermined channels. The first number of channels include a second number, which is smaller than the first number, of predetermined channels including data for controlling the lighting devices. In the first converting step, only data included in the second number of predetermined channels from the first number of channels of the input signal is extracted as data to be included in the communication signal. In the second converting step, the control signal is generated by adding predetermined data in the data included in the communication signal to fill the first number of channels.

By making a computer execute the program having the configuration described above, a data loss may be reduced even when a signal of DMX512 standard is converted once into a signal of a communicable form over the wireless or via the power line and then is re-converted into the signal of DMX512 standard.

The first exemplary embodiment has been described under an assumption that light controller 6, first conversion unit 2, and controller-side communication unit 3 are separate members. However, light controller 6 may include first conversion unit 2 and controller-side communication unit 3 integrally. As used herein the term "integrally" is intended to include cases where a housing is shared, a printed board is shared, and an IC chip is shared.

Alternatively, in the first exemplary embodiment, first conversion unit 2 and controller-side communication unit 3 may be integrally formed as a first converter 8. Alternatively, in the first exemplary embodiment, device-side communication unit 4 and second conversion unit 5 may be integrally formed as a second converter 9. In other words, light control communication system 1 according to the first exemplary embodiment may have a configuration provided with first converter 8 and second converter 9.

In the first exemplary embodiment, the packet loss has been described not as occurring intentionally, but as occurring due to transmission and reception between controller-side communication unit 3 and device-side communication unit 4 due to a difference in throughput between the signal in conformity with the first protocol and the signal in conformity with the second protocol. However, the packet loss may be generated intentionally according to the difference in throughput between the signal in conformity with the first protocol and the signal in conformity with the second protocol.

For example, when first conversion unit 2 converts the input signal into the communication signal, the packet loss may be generated intentionally by extracting the packets in the input signal sporadically in the time series to achieve communication intervals corresponding to the throughput of the signal in conformity with the second protocol.

The exemplary embodiments described above are given simply for the purpose of illustration of the exemplary embodiments of the present disclosure, and numeric values and shapes are also given only for illustrating preferable modes. Therefore, the present disclosure is not limited only to these exemplary embodiments. The configuration may be modified as appropriate without departing a range of a technical thought of the present disclosure.

What is claimed is:

1. A light control communication system comprising:
a first conversion unit configured to convert an input signal in conformity with a first protocol used for controlling a lighting device into a communication signal in conformity with a second protocol;
a controller-side communication unit configured to transmit the communication signal;
a device-side communication unit configured to receive the communication signal from the controller-side communication unit; and
a second conversion unit configured to convert the communication signal received by the device-side communication unit into a control signal in conformity with the first protocol, wherein
each of the input signal and the control signal includes a first number of channels,
the first number of channels include a second number of predetermined channels including data for controlling the lighting device, the second number being smaller than the first number,
the first conversion unit extracts only data included in the second number of predetermined channels from the first number of channels in the input signal as data included in the communication signal, and the second conversion unit generates the control signal by adding predetermined data to the data included in the communication signal to fill the first number of channels.

2. The light control communication system according to claim 1, wherein the second conversion unit adds the predetermined data in a channel of the control signal corresponding to a channel of the input signal having no data extracted by the first conversion unit.

3. The light control communication system according to claim 1, wherein
each of the input signal and the control signal includes a plurality of packets arranged in time series at regular communication intervals, and
the second conversion unit adds a packet to the control signal to make communication intervals of packets in the control signal match communication intervals of packets in the input signal when the communication intervals of the packets in the control signal converted from the communication signal are larger than the communication intervals of the packets in the input signal.

4. The light control communication system according to claim 3, wherein
the second conversion unit adds the packet between the packets in the control signal having communication intervals larger than the communication intervals of the packets in the input signal, and
the packet added has data that makes values of data vary proportionally between data of packets before and after in the communication intervals of the packets in the control signal.

5. The light control communication system according to claim 3, wherein
the second conversion unit adds the packet between the packets in the control signal having communication intervals larger than the communication intervals of the packets in the input signal, and
the packet added has data that maintains a value of data of a packet immediately before in the communication intervals in the control signal for the communication intervals of the packets in the control signal.

6. The light control communication system according to claim 3, wherein
the second conversion unit adds the packet between the packets in the control signal having the communication intervals larger than the communication intervals of the packets in the input signal, and
the packet added has data that makes a value of data vary proportionally from data of a packet immediately before in the communication intervals in the control signal and data of a packet two packets before in the communication intervals in the control signal.

7. The light control communication system according to claim 1, wherein the controller-side communication unit transmits the communication signal to the device-side communication unit wirelessly or via a power line.

8. The light control communication system according to claim 1, wherein the signal in conformity with the first protocol is a signal in conformity with DMX512 standard.

9. The light control communication system according to claim 1, comprising:

a first converter including the first conversion unit and the controller-side communication unit; and
a second converter including the device-side communication unit and the second conversion unit.

10. A light control communication method comprising:
a first converting step for converting an input signal in conformity with a first protocol used for controlling a lighting device into a communication signal in conformity with a second protocol;
a transmitting step for transmitting the communication signal;
a receiving step for receiving the communication signal transmitted; and
a second converting step for converting the communication signal received in the receiving step into a control signal in conformity with the first protocol, wherein
each of the input signal and the control signal includes a first number of channels,
the first number of channels include a second number of predetermined channels including data for controlling the lighting device, the second number being smaller than the first number,
the first converting step includes extracting only data included in the second number of predetermined channels from the first number of predetermined channels in the input signal as data included in the communication signal, and
the second converting step includes generating the control signal by adding predetermined data to the data included in the communication signal to fill the first number of channels.

11. A non-transitory, computer-readable storage medium storing a program causing a computer to execute a light control communication method, the method comprising:
a first converting step for converting an input signal in conformity with a first protocol used for controlling a lighting device into a communication signal in conformity with a second protocol;
a transmitting step for transmitting the communication signal;
a receiving step for receiving the communication signal transmitted; and
a second converting step for converting the communication signal received in the receiving step into a control signal in conformity with the first protocol, wherein
each of the input signal and the control signal includes a first number of channels,
the first number of channels includes a second number of predetermined channels including data for controlling the lighting device, the second number being smaller than the first number,
the first converting step includes extracting only data included in the second number of predetermined channels from the first number of predetermined channels in the input signal as data included in the communication signal, and
the second converting step includes generating the control signal by adding predetermined data to the data included in the communication signal to fill the first number of channels.

* * * * *